United States Patent [19]

Okuzono

[11] Patent Number: 5,268,932
[45] Date of Patent: Dec. 7, 1993

[54] INTERFACE CIRCUIT BETWEEN A PLURALITY OF TRANSMISSION LINES AND HIGH BIT RATE DATA TERMINAL EQUIPMENT

[75] Inventor: Keisuke Okuzono, Fukuoka, Japan
[73] Assignee: Fujitsu Limited, Kawasaki, Japan
[21] Appl. No.: 797,935
[22] Filed: Nov. 26, 1991
[30] Foreign Application Priority Data
Nov. 27, 1990 [JP] Japan .................... 2-327303
[51] Int. Cl.$^5$ .................................... H04L 7/00
[52] U.S. Cl. .................................... 375/106; 375/121
[58] Field of Search ............ 375/4, 7, 8, 9, 106, 375/107, 108, 121; 370/100.1, 103

[56] References Cited

U.S. PATENT DOCUMENTS

| | | | |
|---|---|---|---|
| 3,551,813 | 12/1990 | Kaneko | 375/108 |
| 4,133,981 | 1/1979 | Kibler | 179/15 |
| 4,943,942 | 7/1990 | Dunnion | 375/8 |
| 5,040,189 | 8/1991 | Braun | 375/7 |
| 5,148,430 | 9/1992 | Kuranaga et al. | 375/109 |

FOREIGN PATENT DOCUMENTS

55-162648 12/1980 Japan .
1-137842 5/1989 Japan .

OTHER PUBLICATIONS

Patent Abstract of Japan, vol. 11, No. 280 (E-539) Sep. 10, 1987 and JP-A-62 081 142 (NEC Corp) Apr. 14, 1987.
Patent Abstract of Japan, vol. 10, No. 337 (E-454) (2393) Nov. 14, 1986 and JP-1-61 140 239 (Fujitsu Ltd) Jun. 27, 1986.
Patent Abstract of Japan, vol. 10, No. 386 (E-467) (2443) Dec. 24, 1986, and JP-A-61 177 834 (Hitachi Ltd) Aug. 9, 1986.

*Primary Examiner*—Stephen Chin
*Attorney, Agent, or Firm*—Staas & Halsey

[57] ABSTRACT

A transmission line interface circuit is provided which receives a plurality of channels of data and a plurality of receiving clock signals respectively synchronized with the plurality of channels of data received from the respective transmission lines, and allows outputs of the plurality of channels of data synchronized with a master clock signal which is supplied from outside of the transmission line interface circuit. In addition, the interface circuit receives a plurality of channels of data synchronized with the master clock signal, and outputs a plurality of transmitting clock signals and the plurality of channels of data respectively synchronized with the plurality of transmitting clock signals. The interface circuit includes a plurality of first synchronization timing changing circuits for receiving the plurality of channels of data synchronized with the respective receiving clock signals, and making each bit of the respective channels of data synchronized with one of the receiving clock signals; and a plurality of second synchronization timing changing circuits for receiving the plurality of channels of data synchronized with the above one of the plurality of receiving clock signals, and synchronizing each bit of the plurality of channels of data with the corresponding receiving clock signals, respectively.

8 Claims, 5 Drawing Sheets

INTERFACE CIRCUIT BETWEEN A PLURALITY OF TRANSMISSION LINES AND HIGH BIT RATE DATA TERMINAL EQUIPMENT

BACKGROUND OF THE INVENTION (1) Field of the Invention

The present invention relates to a transmission line interface circuit provided between a plurality of transmission lines and a piece of high bit rate data terminal equipment. Recently, a source of high bit rate data, such as an HDTV (high definition television) apparatus, has been developed, and such high bit rate data is expected to be transmitted through a plurality of transmission lines each having a transmission rate lower that the transmission rate of the source of high bit rate data. Typical applications of the transmission line interface circuit are a piece of terminal equipment and a switching unit in a multi-point television conference system.

(2) Description of the Related Art

Since the transmission lines and the source of high bit rate data respectively operate synchronized with different clock signals, the timing of each bit of synchronized data has to be changed when the data is transferred between a source of a high bit rate and a plurality of transmission lines. Namely, such a transmission line interface circuit receives data from a plurality of transmission lines synchronizing with clock signal in the respective transmission lines, transfers received data to the high bit rate data terminal equipment synchronized with a clock signal of the terminal equipment, receives data from the terminal equipment synchronized with the clock signal of the terminal equipment, and transmits received data through the plurality of transmission lines synchronized with the timing of the respective transmission lines.

In addition to the above, frame phases of transmission frames in the plurality of channels are required to be aligned in the transmission line interface circuit.

The size of construction for changing the timing of each bit of the data synchronized, is required to be small. However, conventionally, there is no compact construction for the transmission line interface circuit containing a plurality of channels of transmission lines, for changing the timing with which each bit of data is synchronized, and aligning frame phases in the plurality of channels.

SUMMARY OF THE INVENTION

An object of the present invention is to provide a transmission line interface circuit, provided between a plurality of transmission lines and a piece of high bit rate data terminal equipment, of small size.

Another object of the present invention is to provide a transmission line interface circuit, provided between a plurality of transmission lines and a piece of high bit rate data terminal equipment which can operate even when a trouble occurs in a part of the transmission lines.

According to the first aspect of the present invention, there is provided a transmission line interface circuit receiving a plurality of channels of data and a plurality of receiving clock signals respectively synchronized with the plurality of channels of data received from the respective transmission lines, and allowing outputs of the plurality of channels of data synchronized with a master clock signal which is supplied from outside of the transmission line interface circuit. In addition, the transmission line interface circuit receives a plurality of channels of data synchronized with the master clock signal, and outputs a plurality of transmitting clock signals and the plurality of channels of data respectively synchronized with the plurality of transmitting clock signals. The transmission line interface circuit includes a plurality of first synchronization timing changing circuits for receiving the plurality of channels of data synchronized with the respective receiving clock signals, and making each bit of the respective channels of data synchronized with a predetermined one of the plurality of receiving clock signals; and a plurality of first FIFO circuits for inputting and holding each bit of the plurality of channels of data synchronized with the predetermined one of the plurality of receiving clock signals, and allowing outputs of the plurality of channels of data synchronized with the master clock signal. Further, the interface circuit includes a plurality of second FIFO circuits for inputting and holding each bit of the plurality of channels of data synchronized with the above master clock signal, and allowing outputs of the plurality of channels of data synchronized with the predetermined one of the plurality of receiving clock signals; and a plurality of second synchronization timing changing circuits for receiving the plurality of channels of data synchronized with the predetermined one of the plurality of receiving clock signals, and making each bit of the plurality of channels of data synchronized with the corresponding receiving clock signals, respectively.

In the above transmission line interface circuit, each of the plurality of first synchronization timing changing circuits may includes a first data latching circuit for latching a corresponding channel of data synchronized with a corresponding one of the plurality of receiving clock signals, an intermediate clock generating circuit for generating an intermediate clock signal, a second data latching circuit for receiving the corresponding channel of data latched in the first data latching circuit, and latching the corresponding channel of data synchronized with the intermediate clock signal, and a third data latching circuit for receiving the corresponding channel of data latched in the second data latching circuit, and latching the corresponding channel of data synchronized with the predetermined one of plurality of receiving clock signals. Further, in the above transmission line interface circuit, each intermediate clock generating circuit may include, a later clock timing detecting circuit for detecting a predetermined phase of one of the predetermined one of the plurality of receiving clock signals and the corresponding one of the plurality of receiving clock signals, where the phase of the clock signal is behind a phase of the other clock signal, and generating a pulse indicating the detected phase, and a delay circuit for delaying the phases of the pulse to generate the intermediate clock signal so that the phases of the corresponding receiving clock signal and the intermediate clock signal differ by an amount in a predetermined range, and the phases of the predetermined one of the plurality of receiving clock signals and the intermediate clock signal differ by an amount in a predetermined range.

According to the second aspect of the present invention, there is provided a transmission line interface circuit receiving a plurality of channels of data and a plurality of receiving clock signals respectively synchronized with the plurality of channels of data received from the respective transmission lines, allowing outputs of the plurality of channels of data synchronized with a master clock signal which is supplied from outside of the transmission line interface circuit, receiving a plurality of channels of data synchronized with the master clock signal, and outputting a plurality of transmitting clock signals and the plurality of channels of data respectively synchronized with the plurality of transmitting clock signals. The transmission line interface circuit includes a plurality of first synchronization timing changing circuits for receiving the plurality of channels of data synchronized with the respective receiving clock signals, and making each bit of the respective channels of data synchronized with a selected one of the plurality of receiving clock signals; a plurality of first FIFO circuits for inputting and holding each bit of the plurality of channels of data synchronized with the selected one of the plurality of receiving clock signals, and allowing outputs of the plurality of channels of data synchronized with the master clock signal; a plurality of second FIFO circuits for inputting and holding each bit of the plurality of channels of data synchronized with the selected one of the plurality of receiving clock signals; a plurality of second synchronization timing changing circuits for receiving the plurality of channels of data synchronized with the above master clock signal, and allowing outputs of the plurality of channels of data synchronized with the selected one of the plurality of receiving clock signals; and a clock selecting circuit for selecting one of the plurality of receiving clock signals as the selected one of the plurality of receiving clock signals to supply the selected receiving clock signal to the plurality of first and second synchronization timing changing circuits and first and second FIFO circuits. The transmission line interface circuit may further include a plurality of clock abnormality detecting circuits respectively for detecting abnormality occurring in the plurality of receiving clock signals, and the clock selecting circuit may select one receiving clock signal among the plurality of receiving clock signals on which abnormality is not detected by the plurality of clock abnormality detecting circuits.

DESCRIPTION OF THE PREFERRED EMBODIMENTS

Figure 1:
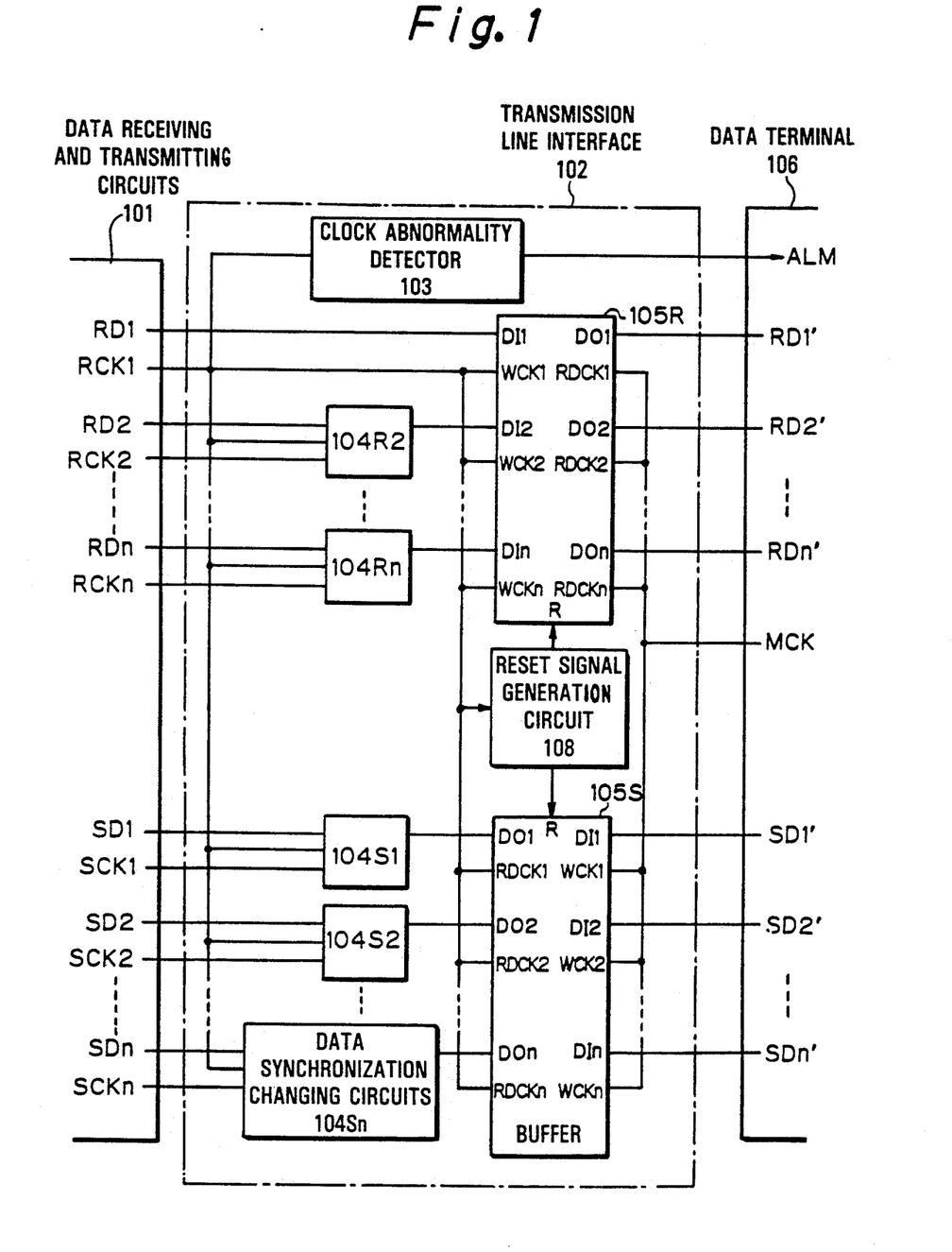
FIGS. 1 is a diagram indicating a construction of the first embodiment of the present invention.

First Embodiment (FIG. 1)

FIG. 1 is a diagram indicating a construction of the first embodiment of the present invention. In FIG. 1, reference numeral 101 denotes a unit containing a plurality of data receiving circuits (not shown) and a plurality of data transmitting circuits (not shown), 102 denotes a transmission line interface circuit according to the present invention, 103 denotes a clock abnormality detecting circuit, 104R2, ... 104Rn each denote a first data synchronization changing circuit, 104S1, ... 104Sn each denote a second data synchronization changing circuit, 105R denotes a first data buffer memory circuit, 105S denotes a second data buffer memory circuit, 106 denotes a piece of data terminal equipment, and 108 denotes a reset signal generation circuit.

Although not shown, the plurality of data receiving circuits and the plurality of data transmitting circuits are respectively connected to a plurality of transmission lines. Each of the data receiving circuits receives data RDi (i=1 to n) through the corresponding transmission line, and obtains a receiving clock signal RCKi (i=1 to n) which synchronizes with respective bits of the received data.

The plurality of first data synchronization changing circuits 104R2, ... 104Rn are provided corresponding to the above plurality of data receiving circuits except a predetermined one of the plurality of data receiving circuits. Each of the plurality of first data synchronization timing changing circuits 104R2, ... 104Rn comprises a data input terminal, a data output terminal, and first and second clock input terminals. The data RDi (i=2 to n) which are output from the plurality of data receiving circuits except the above predetermined one, are respectively applied to the above plurality of first data synchronization changing circuits 104R2, ... 104Rn. Parallel to the data RDi (i=2 to n), the receiving clock signals RCKi (i=2 to n) are respectively applied to the first clock input terminals of the plurality of first data synchronization changing circuits 104R2, ... 104Rn. The receiving clock signal RCK1 from the above predetermined one of the data receiving circuits is applied to all the plurality of first data synchronization changing circuits 104R2, ... 104Rn. Each of the plurality of first synchronization timing changing circuits 104R2, ... 104Rn receives the above data RDi (i=2 to n) received in the corresponding data receiving circuit synchronized with the respective receiving clock signals RCKi (i=2 to n), and synchronizes each bit of the data with the above clock signal RCK1 from the above predetermined data receiving circuit.

The first data buffer memory circuit 105R contains a plurality of FIFO memories each operating in parallel formation, where the plurality of FIFO memories are provided corresponding to the above plurality of data inputs RD1, RD2, ... RDn. Each of the FIFO memories has a data input terminal DIi (i=1 to n), a write clock input terminal WCKi (i=1 to n), a data output terminal DOi (i=1 to n), and a read clock output terminal RDCKi (i=1 to n). The above data synchronized with the receiving clock signals RCKi (i=2 to n) are supplied to the data input terminals DIi (i=2 to n) of the first data buffer memory circuit 105R, respectively. The data RD1 which is output from the above predetermined one of the plurality of data receiving circuits, is directly supplied to the data input terminal DI1. The receiving clock signal RCK1 is applied to the second clock input terminals WCKi (i=1 to n) corresponding to all of the plurality of first data synchronization changing circuits 104R2, ... 104Rn. Thus, the data RD1 is written through the data input terminal DI1 in the first data buffer memory circuit 105R synchronized with the receiving clock signal RCK1, and the other data RDi (i=2 to n) which are synchronized with the above receiving clock signal RCK1 and are output from the plurality of first data synchronization changing circuits 104R2, ... 104Rn, are respectively written through the data input terminals DIi (i=2 to n) in the first data buffer memory circuit 105R synchronized with the receiving clock signal RCK1. The data written through the data input terminals DIi (i=1 to n) in the first data buffer memory circuit 105R, are respectively read out from the corresponding data output terminals DOi (i=1 to n) synchronized with a master clock signal MCK supplied from the data terminal equipment 106.

The above first data buffer memory circuit 105R is provided for detecting and aligning frames of data received in the plurality of data receiving circuits. The operation of detecting and aligning the frames, is controlled by a controller provided in the transmission line interface circuit, but not shown.

The data terminal equipment 106 may be, for example, a piece of television conference terminal equipment which transmits and receives coded data of a television signal, or a switching unit in a multi-point television conference system.

The clock abnormality detecting circuit 103 is provided for detecting an occurrence of abnormality in the receiving clock signals RCKi (i=1 to n). When the abnormality is detected, an alarm signal is supplied to the data terminal equipment 106.

Similarly, the second data buffer memory circuit 105S is provided for aligning frames of a plurality of channels of data SDi' (i=1 to n) which is to be transmitted in the above-mentioned plurality of data transmitting circuits provided in the unit 101. The operation of aligning the frames, is controlled by the above-mentioned controller.

The second data buffer memory circuit 105S contains a plurality of FIFO memories each operating in parallel formation, where the plurality of FIFO memories are provided corresponding to the above plurality of channels of data SD1', SD2', ... SDn'. Each of the FIFO memories has a data input terminal DIi (i=1 to n), a write clock input terminal WCKi (i=1 to n), a data output terminal DOi (i=1 to n), and a read clock output terminal RDCKi (i=1 to n).

The data SDi' (i=1 to n) are supplied from the data terminal equipment 106 to the second data buffer memory circuit 105S together with the master clock signal MCK to write the data SDi' (i=1 to n) through the data input terminals DIi (i=1 to n) in the second data buffer memory circuit 105S synchronized with the master clock signal MCK. The above-mentioned receiving clock signal RCK1 from the predetermined one of the data receiving circuits, is applied to all the clock input terminals RDCKi (i=1 to n) of the second data buffer memory circuit 105S.

The plurality of second data synchronization timing changing circuits 104S1, ... 104Sn are provided corresponding to the above plurality of data transmitting circuits (not shown). Each of the plurality of second synchronization timing changing circuits 104S1, ... 104Sn comprises a data input terminal, a data output terminal, and first and second clock input terminals.

The above data SDi' (i=1 to n) written to the data input terminals DIi (i=1 to n) in the second data buffer memory circuit 105S, are respectively read out through the corresponding data output terminals DOi (i=1 to n) to be applied to the data input terminals of the corresponding second data synchronization timing changing circuits 104S1, ... 104Sn. The above-mentioned receiving clock signal RCK1 from the predetermined one of the data receiving circuits, is applied to all of the write clock input terminals WCKi (i=1 to n) of the second data buffer memory circuit 105S, and the second clock input terminals of all the second data synchronization timing changing circuits 104S1, ... 104Sn. The plurality of data transmitting circuits respectively generate transmitting clock signals SCKi (i=1 to n) to apply the transmitting clock signals SCKi (i=1 to n) to the first clock input terminals of the corresponding second data synchronization timing changing circuits 104S1, ... 104Sn. Each of the plurality of second synchronization timing changing circuits 104S1, ... 104Sn receives the above data from the corresponding data output terminals DOi (i=1 to n) synchronized with the above clock signal RCK1 from the above predetermined data receiving circuit, and synchronizes each bit of the data with the corresponding transmitting clock signals SCKi (i=1 to n). The data SDi (i=1 to n) synchronized with the corresponding transmitting clock signals SCKi (i=2 to n), are supplied from the plurality of second data synchronization timing changing circuits 104S1, ... 104Sn to the corresponding data transmitting circuits in the unit 101.

The reset signal generation circuit 108 generates reset signals which are to be applied to the first and second data buffer memory circuits 105R and 105S, respectively. These reset signals are used to align the frame phases of data in all the plurality of FIFO memories in the respective data buffer memory circuits 105R and 105S. Namely, one of the reset signals is applied to the FIFO memories in the first data buffer memory circuit 105R before a first bit in a frame in all the plurality of channels are to be written in the first data buffer memory circuit 105R, and the other of the reset signals is applied to the FIFO memories in the second data buffer memory circuit 105S before a first bit in a frame in all the plurality of channels are to be written in the second data buffer memory circuit 105S.

Although not shown, the reset signal generation circuit 108 contains a frequency dividing circuit for generating the above reset signals from the above receiving clock signal RCK1. The ratio of the frequency division is generally very high, corresponding to a number of bits contained in each data frame. For example, the frequency of the receiving clock signal RCK1 is, for example, 2 MHz, and the frequency of the reset signal is, for example, 4 KHz. As understood from well known techniques for constructing a frequency dividing circuit, for example, a large number of stages of counters are required to construct such a high frequency division ratio, i.e., size of the frequency dividing circuit 108 is relatively large. This is the reason why the reset signal generation circuit 108 is provided common to all the FIFO memories in the respective data buffer memory circuits 105R and 105S.

Since the timing when each FIFO memory in the first data buffer memory circuit 105R is reset is required to be synchronized with the respective writing clock signals WCKi (i=1 to n) in the first data buffer memory circuit 105R, the writing clock signal WCKi (i=1 to n) in the first data buffer memory circuit 105R must be a common clock signal. In addition, since the timing when each FIFO memory in the second data buffer memory circuit 105S is reset is required to be synchronized with the respective reading clock signals RDCKi (i=1 to n) in the second data buffer memory circuit 105S, the reading clock signal RDCKi (i=1 to n) in the second data buffer memory circuit 105S must be also a common clock signal. Therefore, the receiving clock signal RCK1 is commonly applied to all the input terminals of the writing clock signals WCKi (i=1 to n) in the first data buffer memory circuit 105R and all the reading clock signals RDCKi (i=1 to n) in the second data buffer memory circuit 105S, and the plurality of first and second data synchronization changing circuits 104R2, ... 104Rn, 104S1, 104S2, ... 104Sn, are provided in the transmission line interface circuit.

Figure 2:
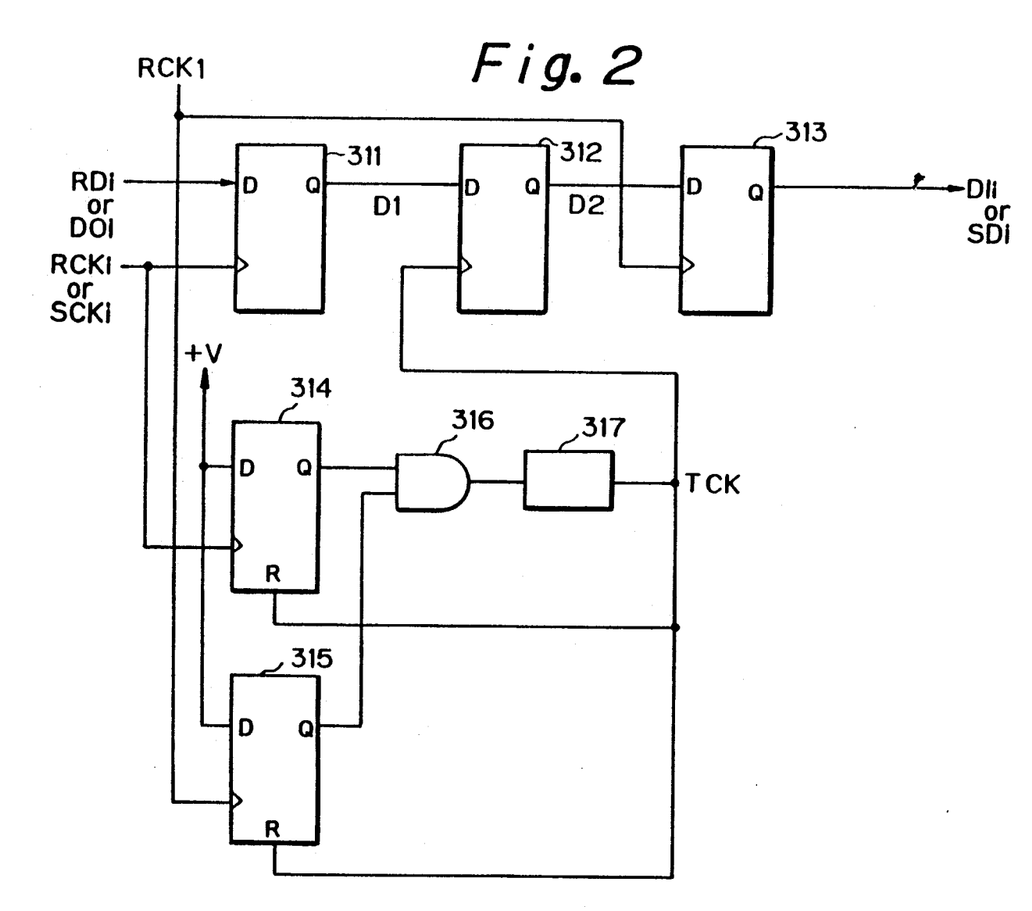
FIG. 2 is a diagram indicating a construction of the synchronization timing changing circuit in the construction of FIG. 1.
Figure 3A:
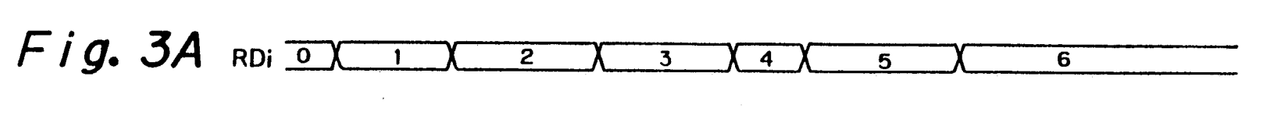
FIGS. 3A-3G are diagrams indicating example timing of the synchronization timing changing circuit.
Figure 3B:
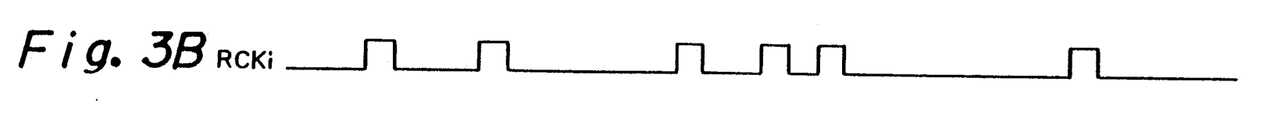
Figure 3C:
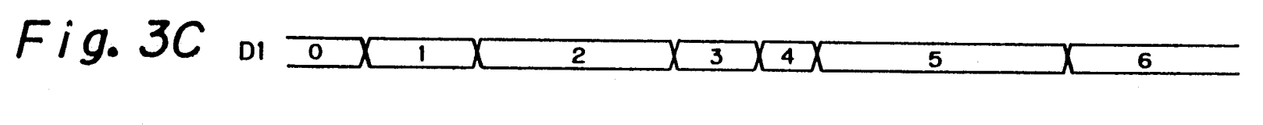
Figure 3D:
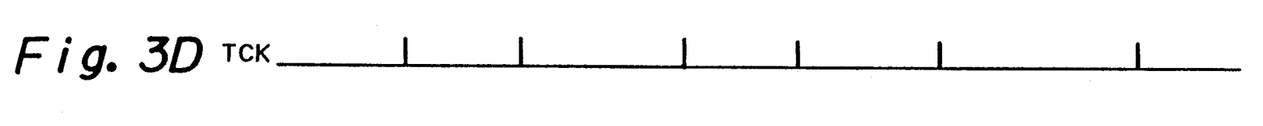
Figure 3E:
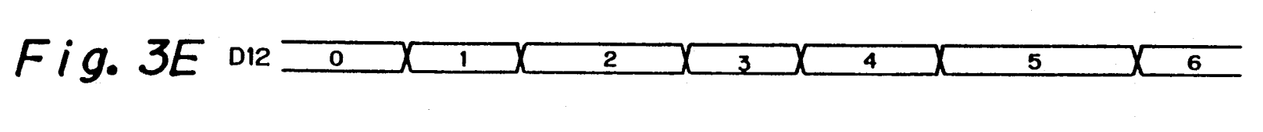
Figure 3F:
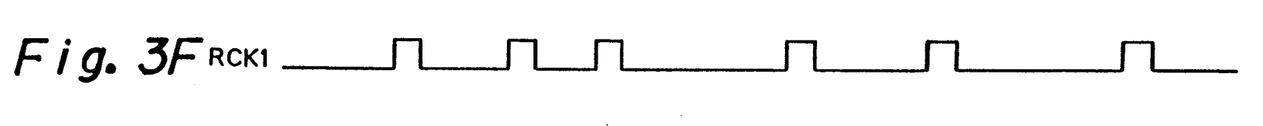
Figure 3G:
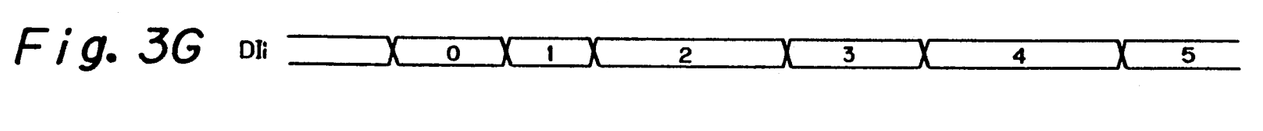

First and Second Synchronization Timing Changing Circuit (FIGS. 2 and 3)

FIG. 2 is a diagram indicating a construction of the first or second synchronization timing changing circuit in the construction of FIG. 1. In FIG. 2, reference numerals 311 to 315 each denote a D-type flip flop circuit, 316 denotes an AND circuit, and 317 denotes a delay circuit. The above-mentioned receiving clock signal RCK1 from the predetermined one of the data receiving circuits is applied to the edge-triggered input terminals of the D-type flip flop circuits 313 and 315. In each first synchronization timing changing circuit 104Ri (i=2 to n), the above-mentioned data RDi from the corresponding data receiving circuit is applied to the data input terminal of the D-type flip flop circuit 311, and the receiving clock signal RCKi from the same data receiving circuit is applied to the edge-triggered input terminals of the D-type flip flop circuits 311 and 314. In each second synchronization timing changing circuit 104Si (i=1 to n), the above-mentioned data DOi from the corresponding data output terminal of the second data buffer memory circuit is applied to the data input terminal of the D-type flip flop circuit 311, and the transmitting clock signal SCKi from the corresponding data transmitting circuit is applied to the edge-triggered input terminals of the D-type flip flop circuits 311 and 314. The data input terminals of the D-type flip flop circuits 314 and 315 are maintained to a high level +V. The data output D1 of the D-type flip flop circuit 311 is applied to the data input terminal of the D-type flip flop circuit 312, and the data output D2 of the D-type flip flop circuit 312 is applied to the data input terminal of the D-type flip flop circuit 313. The data outputs of the D-type flip flop circuits 314 and 315 are applied to the AND circuit 316, and the output of the AND circuit 316 is delayed by the delay circuit 317. The output TCK of the delay circuit 317 is applied to the edge-triggered input terminal of the D-type flip flop circuit 312, and the reset input terminals of the D-type flip flop circuits 314 and 315. The data output of the D-type flip flop circuit 313 is the output of the first or second synchronization timing changing circuit.

In each first synchronization timing changing circuit 104Ri (i=2 to n), the above data RDi from the corresponding data receiving circuit is latched in the D-type flip flop circuit 311 at timing of a leading edge of the receiving clock signal RCKi, and the data output of the D-type flip flop circuit 311 is latched in the D-type flip flop circuit 312 at timing of a leading edge of the output TCK of the delay circuit 317.

In the first synchronization timing changing circuit 104Ri (i=2 to n), the data outputs of the D-type flip flop circuits 314 and 315 rises when both the receiving clock signals RCK1 and RCKi transitions to a high level state in each cycle of the receiving clock signals, and therefore, the output of the AND circuit 316 rises at the timing when one of the receiving clock signals RCK1 and RCKi, the phase of one of the receiving clock signals being behind the phase of the other receiving clock signals, transitions to a high level state. The output TCK of the delay circuit 317 rises to a different state a predetermined time later. The output TCK of the delay circuit 317 provides an intermediate clock signal. The intermediate clock signal TCK and the D-type flip flop circuit 312 ar provided to prevent latching of a data output of a D-type flip flop circuit in a preceding stage, by a D-type flip flop circuit in the following stage at timing when the data output of a D-type flip flop circuit in a preceding stage is unstable. For this purpose, the delay time in the delay circuit 317 is preset so that the data output of the D-type flip flop circuit 311 is latched by the D-type flip flop circuit 312 at timing when the data output of the D-type flip flop circuit 311 is stable, and the data output of the D-type flip flop circuit 312 is latched by the D-type flip flop circuit 313 at timing when the data output of the D-type flip flop circuit 312 is stable. In the other words, the delay time in the delay circuit 317 is preset so that the phases of the corresponding receiving clock signal and the intermediate clock signal differ by an amount in a predetermined range, and the phases of the predetermined one of the plurality of receiving clock signals and the intermediate clock signal differ by an amount in a predetermined range to realize the above effect.

Similar to the above, in the second synchronization timing changing circuit 104Si (i=1 to n), the delay time in the delay circuit 317 is preset so that the phases of the corresponding receiving clock signal and the intermediate clock signal differ by an amount in a predetermined range, and the phases of the predetermined one of the plurality of receiving clock signals and the intermediate clock signal differ by an amount in a predetermined range so that the data output of the D-type flip flop circuit 311 is latched by the D-type flip flop circuit 312 at timing when the data output of the D-type flip flop circuit 311 is stable, and the data output of the D-type flip flop circuit 312 is latched by the D-type flip flop circuit 313 at timing when the data output of the D-type flip flop circuit 312 is stable.

FIGS. 3A-3G are diagrams indicating example timing of the synchronization timing changing circuit.

Thus, according to the first embodiment of the present invention, the data transferred through the transmission line interface circuit 102 are synchronized with the common clock signal RCK1 due to the functions of the first and second synchronization timing changing circuits 104Ri (i=2 to n) and 104Si (i=1 to n), and the constructions of the first and second synchronization timing changing circuits 104Ri (i=2 to n) and 104Si (i=1 to n) are very simple and are realized by compact circuitry. Therefore, the size of the transmission line interface circuit 102 can be made small.

Figure 4:
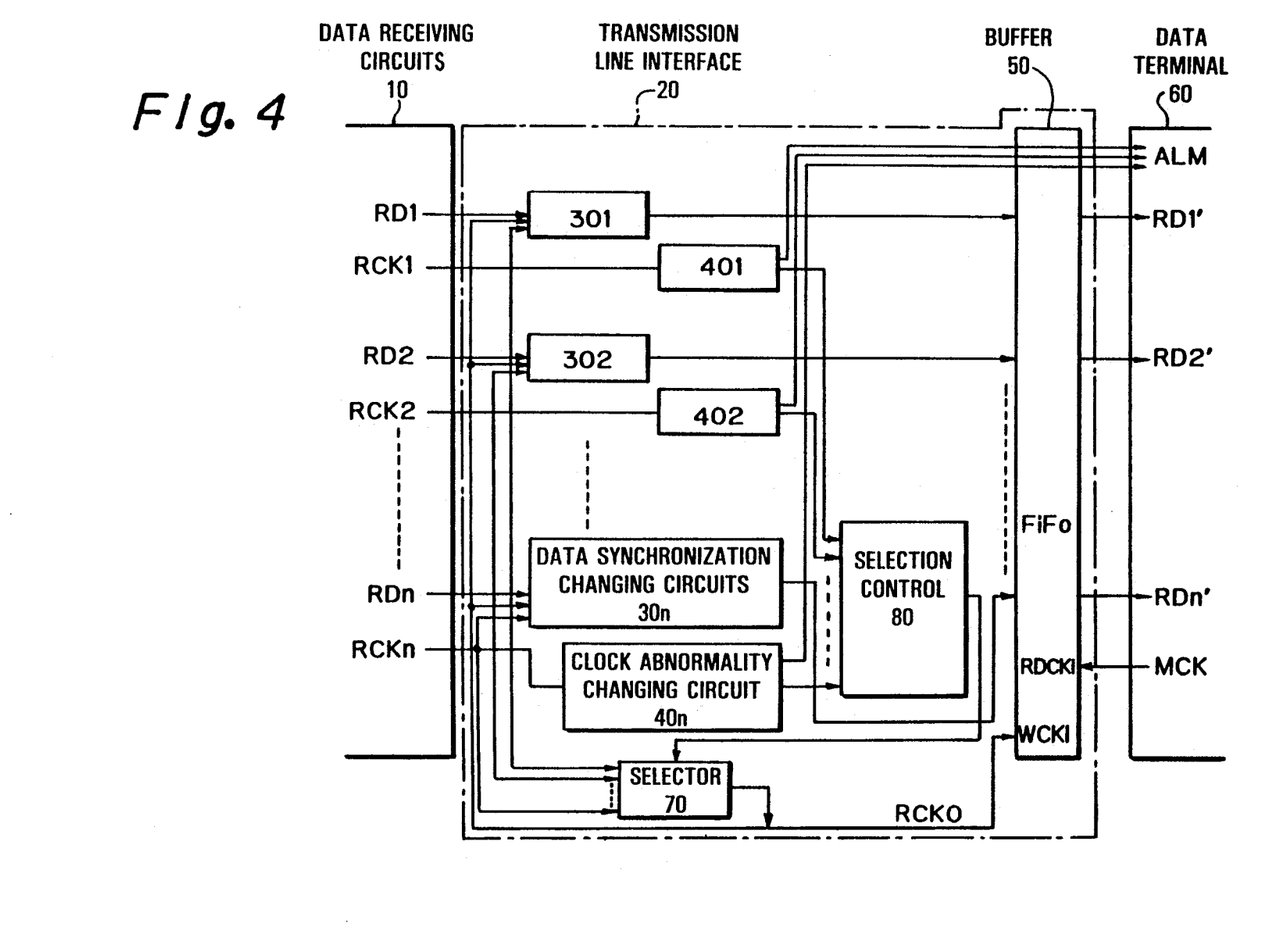
FIG. 4 is a diagram indicating a construction of the second embodiment of the present invention.
Figure 5A:
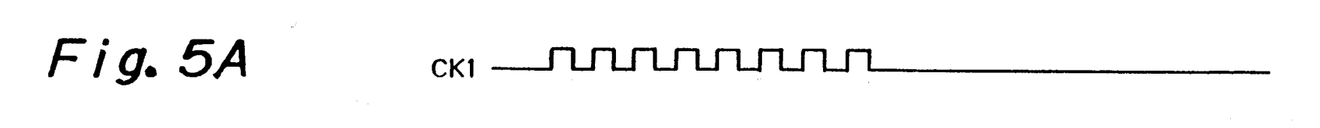
FIGS. 5A-5G are diagrams indicating example timing of the second embodiment of the present invention.
Figure 5B:
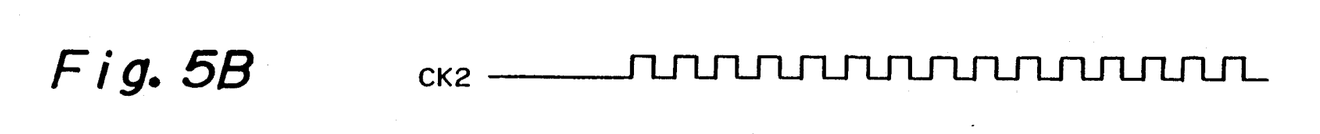
Figure 5C:
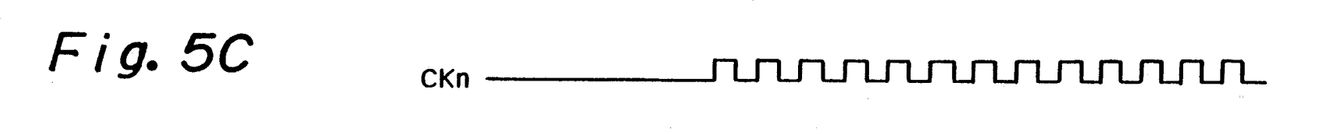
Figure 5D:
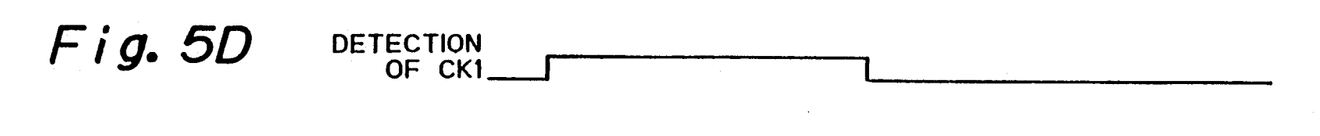
Figure 5E:
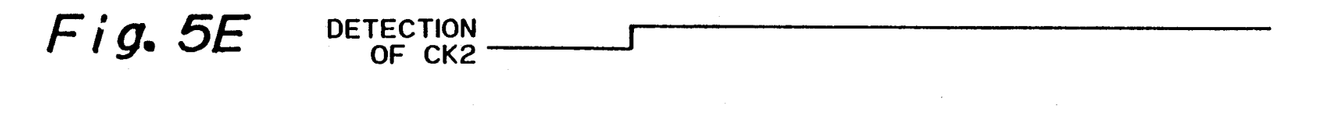
Figure 5F:
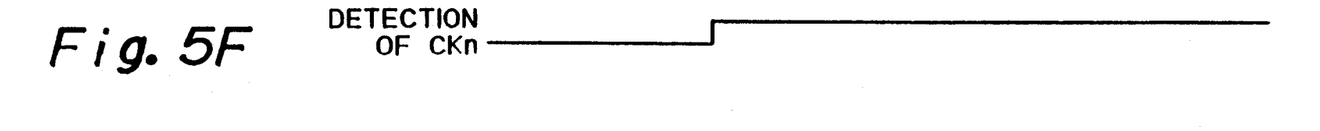
Figure 5G:
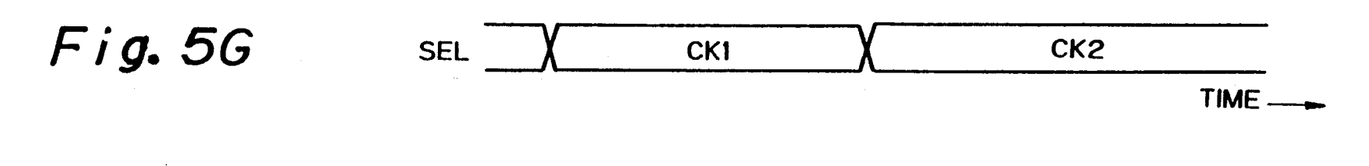

Second Embodiment (FIGS. 4 and 5)

FIG. 4 is a diagram indicating a construction of the second embodiment of the present invention. In FIG. 4, reference numeral 10 denotes a unit containing a plurality of data receiving circuits (not shown) and a plurality of data transmitting circuits (not shown), 20 denotes a transmission line interface circuit according to the present invention, 301, 302, ... 30n each denote a first data synchronization changing circuit which functions the same as the first data synchronization changing circuit 104Ri in FIG. 1, 401, 402, ... 40n each denote a clock abnormality detecting circuit, 50 denotes a first data buffer memory circuit which functions the same as the first data buffer memory circuit 105R in FIG. 1, 60 denotes data terminal equipment, 70 denotes a selector, and 80 denotes a selection control circuit. Although not shown, a second data buffer memory circuit which functions the same as the second data buffer memory circuit 105S in FIG. 1, and a plurality of second data synchronization changing circuits which function the same as the plurality of second data synchronization changing circuits 104Si (i=1 to n) in FIG. 1, are provided in the transmission line interface circuit 20 according to the second embodiment of the present invention.

Similar to the first embodiment of the present invention, although not shown, the plurality of data receiving circuits and the plurality of data transmitting circuits are respectively connected to a plurality of transmission lines. Each of the data receiving circuit receives data RDi (i=1 to n) through the corresponding transmission line, and obtains a receiving clock signal RCKi (i=1 to n) which synchronizes with respective bits of the received data. Each of the first data synchronization changing circuit 301, 302, ... 30n in FIG. 4 has the same construction as, and functions essentially the same as the first data synchronization changing circuit 104Ri (i=2 to n) in FIG. 1, and the first data buffer memory circuit 50 in FIG. 4 functions the same as the first data buffer memory circuit 105R in FIG. 1, except as explained below.

In the construction of FIG. 4, the clock abnormality detecting circuits 401, 402, ... 40n are provided corresponding to the plurality of data receiving circuits in the unit 10, and each detect an occurrence of abnormality in the receiving clock signal which is output from the corresponding data receiving circuit in the unit 10. The results of the detection in the plurality of the clock abnormality detecting circuits 401, 402, ... 40n, are applied to the selection control circuit 80, and the data terminal equipment 60. In the data terminal equipment 60, an alarm is generated when the above results of the detection indicate an occurrence of abnormality in the receiving clock signals RCKi. The selection control circuit 80 determines one of the plurality of receiving clock signals RCKi (i=1 to n) as a common clock signal RCK0, and controls the selector 70 so that the selector 70 selects the determined one of the plurality of receiving clock signals RCKi (i=1 to n). The selector 70 receives all the receiving clock signals RCKi (i=1 to n), and outputs the selected one of the plurality of receiving clock signals RCKi (i=1 to n). The selected receiving clock signal, which is denoted by RCK0 in FIG. 4, instead of the receiving clock signal RCK1 in the construction of FIG. 1, is applied to the above-mentioned second clock input terminals of all the plurality of the first synchronization timing changing circuits 301, 302, ... 30n and the plurality of second synchronization timing changing circuits (not shown in FIG. 4), and the first clock input terminals RDCKi (i=1 to n) of the first data buffer memory circuit 50.

The plurality of first data synchronization changing circuits 301, 302, ... 30n are provided corresponding to all of the data receiving circuits in the unit 10. The data RDi (i=1 to n) and the corresponding receiving clock signals RCKi (i=1 to n) are respectively supplied to the data input terminals and the first clock input terminals of the corresponding first data synchronization timing changing circuits 301, 302, ... 30n, and each of the plurality of first data synchronization timing changing circuits 301, 302, ... 30n receives the above data RDi (i=1 to n) received in the corresponding data receiving circuit synchronized with the respective receiving clock signals RCKi (i=2 to n), and synchronizes each bit of the data with the above common clock signal RCK0 which is supplied from the selector 70. In addition, each of the plurality of second synchronization timing changing circuits (not shown in FIG. 4) receives the above data from the corresponding data output terminals DOi (i=1 to n) synchronized with the above common clock signal RCK0, and synchronizes each bit of the data with the corresponding transmitting clock signals SCKi (i=1 to n).

FIGS. 5A to 5G are diagrams indicating example timing of the second embodiment of the present invention. In the example of FIGS. 5A to 5G, at the time t1, only the receiving clock signal RCK1 is normally detected. Therefore, the selector 70 selects the receiving clock signal RCK1 as the common receiving clock signal RCK0, based on the detection results of the clock abnormality detecting circuits 401, 402, ... 40n. The receiving clock signal RCK2 becomes normal at the time t2, and then the receiving clock signal RCKn becomes normal at the time tn. Then, at the time t4, the receiving clock signal RCK1 becomes abnormal, and the abnormality is detected by the clock abnormality detecting circuit 401. In response to the detection of the abnormality, the selection control circuit 80 determines the receiving clock signal RCK2, instead of the receiving clock signal RCK1, as the common receiving clock signal RCK0.

Thus, according to the second embodiment of the present invention, even when a part of the plurality of the receiving clock signals RCKi (i=1 to n) becomes abnormal, for example, the receiving clock signals RCKi are lost due to a trouble occurring in one of the plurality of transmission lines, the transmission and reception of data through the remaining transmission lines can be performed using one of the normal receiving clock signals as the common receiving clock signal RCK0.

Although not shown, a reset signal generation circuit functioning the same as the reset signal generation circuit 108 in FIG. 1, is provided in the transmission line interface circuit in the second embodiment. The reset signal generation circuit in the second embodiment generates the reset signals synchronizing with the above common receiving clock signal RCK0, instead of synchronization with the receiving clock signal RCK1 in the first embodiment.

What is claimed is:

1. A transmission line interface circuit receiving a first plurality of channels of data having first bits and a plurality of receiving clock signals respectively synchronized with the first plurality of channels of data received from respective transmission lines, synchronizing the first plurality of channels of data with a master clock signal supplied from outside of the transmission line interface circuit resulting in a first synchronized plurality of channels of data which is output from the transmission line interface circuit, receiving a second synchronized plurality of channels of data having second bits synchronized with the master clock signal, and outputting a plurality of transmitting clock signals and a third synchronized plurality of channels of data synchronized with the plurality of channels of data synchronized with the plurality of transmitting clock signals, said transmission line interface circuit comprising:

a plurality of first synchronization timing changing means for receiving said first plurality of channels of data respectively synchronized with the plurality of receiving clock signals, and synchronizing each of the first bits of the first plurality of channels of data with a predetermined one of the plurality of receiving clock signals producing a fourth synchronized plurality of channels of data having third bits;

a plurality of first FIFO means for inputting and holding each of the third bits of said fourth synchronized plurality of channels of data synchronized with said predetermined one of the plurality of receiving clock signals, and outputting the second synchronized plurality of channels of data synchronized with the master clock signal;

a plurality of second FIFO means for inputting and holding each of the second bits of said second synchronized plurality of channels of data synchronized with said master clock signal, and outputting the fourth synchronized plurality of channels of data synchronized with said predetermined one of the plurality of receiving clock signals; and a plurality of second synchronization timing changing means for receiving said fourth synchronized plurality of channels of data synchronized with said predetermined one of the plurality of receiving clock signals, and synchronizing each of the first bits of the first plurality of channels of data corresponding to the plurality of receiving clock signals, respectively.

2. A transmission line interface circuit according to claim 1, wherein each of said plurality of first synchronization timing changing means comprises;

first data latching means for latching a corresponding channel of data synchronized with a corresponding one of said plurality of receiving clock signals forming first latched data, intermediate clock generating means for generating an intermediate clock signal, second data latching means for receiving the first latched data latched in the first data latching means and for receiving said intermediate clock signal, and latching the first latched data synchronized with said intermediate clock signal forming second latched data, and third data latching means for receiving the second latched data latched in the second data latching means and for receiving said predetermined one of the plurality of receiving clock signals, and latching the second latched data synchronized with said predetermined one of the plurality of receiving clock signals.

3. A transmission line interface circuit according to claim 2, wherein the corresponding receiving clock signal has a third phase and the intermediate clock signal has a fourth phase, and wherein each of aid intermediate clock generating means comprises:

later clock timing detecting means for detecting a predetermined phase of one of said predetermined one of the plurality of receiving clock signals having a first phase and said corresponding one of said plurality of receiving clock signals having a second phase, where one of said first and second phases is behind a second of said first and second phases, and generating a pulse indicating the predetermined phase, and delay means for delaying the predetermined phase of said pulse to generate said intermediate clock signal producing a first difference between the third phase of the corresponding receiving clock signal and the fourth phase of the intermediate clock signal of a first amount in a first predetermined range, and producing a second difference between the first phase of the predetermined one of the plurality of receiving clock signals and the fourth phase of the intermediate clock signal of a second amount in a second predetermined range.

4. A transmission line interface circuit according to claim 1, further comprising a reset signal generating means for generating reset signals respectively resetting said plurality of first and second FIFO means, wherein each of said reset signals is synchronized with said predetermined one of the plurality of receiving clock signals.

5. A transmission line interface circuit receiving a first plurality of channels of data having first bits and a plurality of receiving clock signals respectively synchronized with the first plurality of channels of data received from respective transmission lines, synchronizing the first plurality of channels of data with a master clock signal which is supplied from outside of the transmission line interface circuit resulting in a first synchronized plurality of channels of data which are output from the transmission line interface circuit, receiving a second synchronized plurality of channels of data having second bits synchronized with the master clock signal, and outputting a plurality of transmitting clock signals and a third synchronized plurality of channels transmitting clock signals and a third synchronized plurality of channels of data respectively synchronized with the plurality of transmitting clock signals, said transmission line interface circuit comprising:

a plurality of first synchronization timing changing means for receiving said first plurality of channels of data respectively synchronized with the plurality of receiving clock signals, and synchronizing each of the first bits of the first plurality of channels of data with a selected one of the plurality of receiving clock signals producing a fourth synchronized plurality of channels of data having third bits;

a plurality of first FIFO means for inputting and holding each of the third bits of said fourth synchronized plurality of channels of data synchronized with said selected one of the plurality of receiving clock signals, and outputting the second synchronized plurality of channels of data synchronized with the master clock signal;

a plurality of second FIFO means for inputting and holding each of the second bits of said second synchronized plurality of channels of data synchronized with said master clock signal, and outputting the fourth synchronized plurality of channels of data synchronized with said selected one of the plurality of receiving clock signals;

a plurality of second synchronization timing changing means for receiving said fourth synchronized plurality of channels of data synchronized with said selected one of the plurality of receiving clock signals, and synchronizing each of the first bits of the first plurality of channels of data corresponding to the plurality of receiving clock signals, respectively; and clock selecting means for selecting one of said plurality of receiving clock signals as said selected one of said plurality of receiving clock signals to supply the selected one of the plurality of receiving clock signals to said plurality of first and second synchronization timing changing means and said plurality of first and second FIFO means.

6. A transmission line interface circuit according to claim 5, further comprising a plurality of clock abnormality detecting means for respectively detecting an abnormality occurring in each of the plurality of receiving clock signals, and wherein said clock selecting means selecting said selected one of said receiving clock signals among the plurality of receiving clock signals for which the abnormality is not detected by said plurality of clock abnormality detecting means.

7. A transmission line interface circuit according to claim 5, further comprising:

clock abnormality detecting means for respectively detecting an abnormality occurring in each of the plurality of receiving clock signals; and a plurality of clock alarm means for respectively outputting an alarm signal indicating an occurrence of the abnormality occurring in a first corresponding one of the plurality of receiving clock signals and detected in a second corresponding one of the clock abnormality detecting means.

8. A transmission line interface circuit according to claim 5, further comprising reset signal generating means for generating reset signals respectively resetting said plurality of first and second FIFO means, wherein each of said reset signals is synchronized with said selected one of the plurality of receiving clock signals.

* * * * *